UNITED STATES PATENT OFFICE.

CARLETON ELLIS, OF MONTCLAIR, NEW JERSEY.

TREATING CONCRETE.

1,189,551.  Specification of Letters Patent.  Patented July 4, 1916.

No Drawing.  Application filed October 17, 1911.  Serial No. 655,214.

*To all whom it may concern:*

Be it known that I, CARLETON ELLIS, a citizen of the United States, and resident of Montclair, in the county of Essex and State of New Jersey, have invented certain new and useful Improvements in Treating Concrete, of which the following is a specification.

This invention relates to concrete coating or finishing compositions and more particularly to the process of coating concrete to form a new article of manufacture or concrete product, all as more fully hereinafter described and as claimed.

The present invention provides a composition capable of withstanding the disintegrating action of weather and alkali and which may be given a body or consistency dependent on the degree of porosity of concrete. As ordinarily prepared concrete is a fairly porous material and absorbs oil very easily by capillary action. In the parlance of the trade this action is known as suction and for the preliminary coating of concrete, oils of high body which resist suction to a considerable degree are often required. Various materials are therefore set forth in the present invention for the purpose of providing consistencies suitable for the various conditions of concrete and cement coating.

As a basis for cement and concrete coating I preferably make use of a resinous base of a substantially unsaponifiable character, such for example as Jelutong or Pontianak rubber resin. These resins are essentially or characteristically unsaponifiable and thus differ from the resins ordinarily used in the making of varnishes and paint mediums. To be sure there is, in some of the ordinary resins, especially the harder sorts a small and varying amount of unsaponifiable matter but essentially the resins of the varnish trade are saponifiable bodies and therefore not well fitted for serving as a basis for concrete coatings. Most of the resins used in the making of varnishes and paint oils contain not only saponifiable esters but often a large amount of free resin acids. Boiling alcoholic potash readily saponifies these constituents but the alkalis of cement have only a slow saponifying action. In the form of concrete coating containing acid material for the purpose of neutralizing the alkalinity of concrete, as is the case with certain types of concrete primers, the speed of neutralization has to be considered. If the acid component acts rapidly, neutralization may be effected before the coating has set and dried. If the action of the acid component is slow, neutralization and reaction may go on after setting and drying of the composition thus causing rupturing of the coating and its ultimate destruction. The resin acids differ from the fatty acids in this respect. They are slower than the fatty acids in neutralizing activity, so slow in fact that under ordinary conditions a coating compound has opportunity to dry and harden before neutralizing reactions are fairly under way and these subsequently progress to the detriment of the coating.

The following brief comparison may serve to explain the differences noted. The fats are bodies of synthetic origin and as glycerids form well characterized bodies. The resins are largely bodies resulting from condensation, are very fluctuating in composition and the nature of their components is not at all well established at the present time. The copals which are so extensively used in varnish making, vary in composition very greatly. Manila copal, for example, may have an acid number of 135 and a saponifiable value of 185, while Angola copal will perhaps give an acid number of 60 and a saponifiable value of 135. Borneo copal will give an acid number of about 145 and a saponifiable value of say 180. Amber contains about 30% resin acids and nearly 70% of saponifiable esters. Common resin has an acid number of about 140, although this varies considerably with different grades. It consists largely of abietic acid and its anhydrid. Sandarac has an acid number of about 150 but is also subject to considerable variation in composition. However the uncertain composition of resins makes all these figures of indifferent value and the variations in ester value and acidity, together with the further changes taking place in the fusing or melting of the hard gums or resins, preparatory to mixing with oils and thinners, leaves in doubt, always, the action of the resin acids and esters on the alkali. The use therefore of "short oil varnishes," that is varnishes high in saponifiable resin and low in oil, for coating cement structures is at best only a makeshift. The fatty acids from ordinary fats, including such well defined bodies as stearic, palmitic and oleic acids, are more rapid in their neutralizing action and are more homogeneous in composition so that their reaction with cement alkali is more effective and decisive. The same is true of the fatty acids of drying oils, such as linseed and tung or soy bean oils; or the slower drying oils, as corn and cotton seed oil. The fatty acids of the drying oils have the advantage that after neutralizing the superficial alkali of concrete, forming in the main a lime soap of a water insoluble character, drying sets in and a more resistant body is produced. The lime soaps of the resin acids are quite prone to hydrolysis while the same is true to some extent of the lime soaps of the non-drying oils. The drying oils are better adapted to resist the hydrolyzing action of moisture, as their lime soaps, when applied to concrete in the form of a solution in a suitable solvent or when formed in or on the cement by the action of their fatty acids applied as a priming coat, for example, undergo oxidation and form oxidized soaps which do not exhibit the same hydrolyzable tendencies. Of the drying oils the acid derived from tung oil is perhaps most satisfactory in this respect. The lime tungate which forms on applying tung acid to concrete has excellent water-proofing qualities. Second in this respect, ordinarily, are the acids of fish and linseed oils.

In an application entitled Cement primer, filed May 24, 1909, Ser. No. 497,934; application for binding and coating composition, filed March 29, 1910, Ser. No. 552,178; application for process of coating concrete, filed Oct. 22, 1910, Ser. No. 588,549, now Letters Patent No. 999,493 of Aug. 1, 1911; application for waterproofing coating composition for concrete, etc., filed Feb. 16, 1911, Ser. No. 608,888, now Letters Patent No. 999,708 of Aug. 1, 1911; application for concrete and stucco paint oil, filed May 20, 1911, Ser. No. 628,577, now Letters Patent No. 1,005,818 of Oct. 17, 1911; and application for composition for priming and coating concrete, filed July 14, 1911, Ser. No. 638,515, now Letters Patent No. 1,006,737 of Oct. 24, 1911, I have set forth the use of fatty acid neutralizers and unsaponifiable or substantially unsaponifiable resinous or other bodies with or without colloidal thickeners or bodying materials for the priming or coating of concrete and other structures and have set forth in particular the advantages of Jelutong or Pontianak rubber resin for this purpose. The present application contains certain matter derived from the foregoing Letters Patent and applications.

Jelutong resin is a waste or by-product derived from the deresination of pontianak, as will be hereinafter set forth more in detail, and its resistance to alkali, due to its relatively very high proportion of unsaponifiable bodies, makes its especially useful for the coating of concrete. The alkali-proof quality apparently resides, as indicated, in the very low or almost complete absence of the acids and readily saponifiable esters ordinarily found in varnish resins of the usual type, and in the presence, seemingly, of a large proportion of resistant hydrocarbons derived from the oxidation of rubber.

With raw Pontianak resin, that is, resin which has not been heat-treated, petroleum naphtha, more particularly in conjunction with coal tar naphtha may be used more or less; especially if, as set forth in U. S. Letters Patent No. 999,493, the petroleum product is more volatile than the aromatic product. In the foregoing formulas, in case the raw resin is used, the coal tar naphtha may be replaced to the extent of 10%–20%, more or less by petroleum naphtha.

As stated, a colloidal thickener is required for solutions which are to be applied to very porous concrete, for the rubber resin solution as usually prepared has rather slight body in concentration of 25% or 30% or so. To prevent suction on the work the addition of such colloids as polymerized oils, particularly polymerized tung oil, aluminum tungate or the aluminum soap of fish oil are serviceable. Rubber also may be used as a colloiding material. Certain waxes may be used in moderate amount, although not as satisfactory for this specific purpose as the above mentioned colloids. The waxes as a rule diminish the gloss; a consideration of some importance in the case of finish for stucco, which usually is specified as dull or matt. Saponifiable waxes such as beeswax, which have a slow neutralizing action on the free alkali of concrete are not desirable in a priming coat and are not as effective as the inert waxes like ceresin. Montan wax or montanic acid may however be used to advantage in some cases. A product resistant to suction is secured by saponifying a drying oil, such as linseed oil, fish, Chinese wood oil, corn or cotton seed oil with caustic alkali and subsequently precipitating the soap formed in this manner by a soluble salt of aluminum or any other suitable metallic salt which forms a substantially water-insoluble soap but soluble in oils or volatile hydrocarbon solvents and the like to form colloidal solutions. Inasmuch as lime is the active ingredient, to a very large extent, in concrete, the lime soaps of these oils may be advantageously used. The aluminum soaps however have pronounced colloiding or bodying properties and are to be preferred when a viscous oil is desired.

The oils from which the metallic soap is prepared may be treated so as to be completely saponified by the use of the requisite amount of caustic alkali and subsequent complete precipitation as a metallic soap, or the oil may be partly saponified according to circumstances. If concrete is not painted until it has been exposed to the weather for a number of years, which is sometimes the case, a good deal of the alkali has become carbonated and is not active. Under such circumstances, the presence of a moderate amount of saponifiable oil, especially if accompanied by a large proportion of unsaponifiable material, is not always objectionable.

In Ser. No. 497,934, filed May 24, 1909, I have set forth the advantages of applying to concrete a priming coat of an oily character containing fatty acids, especially those of siccative oils and have enumerated the following illustrative formulas;—(A) one part of free fatty acid from linseed oil, one part of linseed oil and one part of tung oil; (B) equal parts of linseed oil and linseed oil fatty acids; (C) equal parts of linseed oil, linseed oil fatty acids and gum thus (D) linseed oil eight parts, linseed oil fatty acids seven parts, tung oil three parts, resin two parts, lithopone 15 parts and gypsum four parts—other resins such as Manila or kauri copal being substituted for the resin, if desired, or the resinous material omitted entirely, or increased and the oil reduced in amount to make a more rapidly drying composition; (E) linseed oil fatty acids seven parts, kauri copal ten parts, resin three parts, benzin six parts, turpentine three parts and zinc sulfid twenty parts.

I have observed that the fatty acid of tung oil possesses the desirable high speed of neutralization characteristic of linseed oil fatty acids and certain others, that like the linseed oil fatty acids the tung acids are miscible with other oils and thinners such as used in varnish making, that they have excellent siccative qualities in the presence of small amounts of driers and that they have a specific waterproofing quality rendering these tung acids very useful in the priming of concrete subject to extreme service conditions. Tung acids may therefore be used in the above formulas A to E inclusive when conditions indicate a greater adaptability for the purpose in hand, than the fatty acids of linseed oil. In the above last mentioned formulas an unsaponifiable or substantially unsaponifiable resin such as Jelutong rubber resin may be substituted for the essentially saponifiable kauri, Manila copal or resin, or for the linseed and Chinese wood oil. It should be noted, however, that Chinese wood oil is more resistant to lime saponification than linseed oil. Although tung oil is a glycerin and is saponified with considerable ease by potash or soda or other alkali forming a water-soluble soap, it does not saponify easily when in contact with the free lime of cement, provided neither potash or soda are present in more than minute amounts as is the case with some kinds of Portland cement. Thus tung oil has certain advantages over linseed oil in this respect. Tung oil belongs to a class of oils which are rather easily acted on by light to form what appear to be polymerized bodies and in the polymeric or changed condition are not as sensitive to free lime.

Many drying and non-drying oils may be polymerized by heating to a high temperature for a short period. Linseed oil polymerizes at temperatures between 250—300 deg. C., although at somewhat lower temperatures it is changed in constitution more or less. Castor oil, which is a non-drying oil polymerizes at about the same temperature and then becomes soluble in mineral oils and petroleum thinners. Wood oil polymerizes easily at somewhat lower temperatures and gelatinizes to form an elastic compound which is scarcely soluble in most solvents. If it is carefully heated only to a point where polymerization begins the product will dissolve in some solvents. The presence of resinous bodies retards gelatinization and permits of heating the oil to much higher temperatures without solidification resulting. The inner anhydrids of the fatty acids which presumably form on such heating are not so easily saponified as the raw oil and if combined with pontianak or similar alkali resistant body having finish-forming properties a concrete oil may be derived which serves fairly well on concrete low in potash or soda. It should be stated that the glycerin content of gelatinized tung oil is less than that of the normal oil, which is a point in its favor in connection with the preparation of concrete oils, as glycerin is not only a hygroscopic substance but it is a solvent for lime, and lime in the form of glycerid may easily exhibit a higher concentration of hydroxyl ions than lime in only aqueous solution. Tung oil is also polymerized or gelatinized by sulfuric acid, and the product obtained by using acid only of moderate concentration may be incorporated in concrete oil compositions. Similarly the tung acids may be polymerized by heat or chemical treatment. Castor oil or its fatty acids may be polymerized with gelatinization by heating with a concentrated solution of zinc chlorid or other condensing agent. The reaction is not probably true polymerization but it affords a means of preparing a colloidal thickening agent for certain solutions. When castor oil is treated with strong sulfuric acid, it does not gelatinize like tung oil, but forms ricinsulfuric acid and other sulfonated products. Some of the other animal and vegetable oils act similarly, as is well known. The sulfonated oils may be used as the acid component in acid primers for concrete, or water-insoluble soaps such as the lime or aluminum or zinc compounds may be used as colloidal thickeners. The sulfonic radical in such oils reduces the tendency of the soaps prepared therefrom to hydrolyze under the prolonged action of water or dampness. Acid neutralizers soluble in organic solvents may be obtained from naphthalene by chlorinating to form a hydrochlorid of naphthalene chlorid. This and similar hydrochlorids have the advantage of substantial freedom from corrosive action and so may replace hydrochloric acid to advantage. Chlorinated naphthalene or naphthol and other chlorinated aromatic compounds may be used as thickeners. Chlorinated linseed, tung, cotton-seed, corn and resin oils and the like also in some forms are useful as thickeners. The chlorinated compounds of these oils formed by the action of sulfur chlorid are very useful bodying or colloiding agents, as are also the vulcanized oils derived by heating the oils with sulfur. Sulfur chlorid with rape, tung, linseed, candle nut, soy bean, perilla resin, corn, cotton seed, fish, peanut, olive, castor, palm, lard, tallow and other oils forms more or less oil-soluble products depending upon the amount of sulfur chlorid employed. The fatty acids from these oils react with sulfur chlorid in a different manner from the glycerids themselves, and as a rule are more soluble in oils and paint thinners. If these oils are mixed with a solution of Pontianak resin or other resin solution, using preferably a solvent unaffected by sulfur chlorid and to this mixture a suitable quantity of sulfur chlorid is added a more satisfactory incorporation is secured than when the oil is separately treated with sulfur chlorid.

The action of the chlorid on the strongly drying oils is so energetic that difficultly soluble compounds are produced unless great care is taken in their preparation and the semi-drying oils are more easily treated with sulfur chlorid for the purpose of producing readily soluble but highly colloidal thickening agents. To obtain these desirable thickening agents free from chlorin the oils may be vulcanized with sulfur at 120 deg. C., more or less. In this case also too great an amount of sulfur produces insoluble bodies and ordinarily from 5% to 10% of sulfur is sufficient. The bodying properties of tung oil are improved by treatment with only 3% of sulfur. Stearic acid does not absorb sulfur at the vulcanizing temperature of melting point of sulfur, or even at somewhat higher temperatures. Oleic acid, on the contrary absorbs some 10% of sulfur at 130 deg. C. to 150 deg. C. and this thickened acid may be used as a neutralizer of concrete alkali in priming compositions. Some of the nitrated oils, as linseed and castor oils, serve as colloidal thickeners.

Among the solvents suitable for the dissolution of Jelutong resin and the like, benzol and its homologues, toluol and xylol are as indicated most useful. Carbon bisulfid is likewise efficient. Carbon tetrachlorid and other chlorids of carbon, such as the chlorid of ethylene and ethane afford non-inflammable solutions. Petroleum benzin, ligroin, kerosene, light kerosene or heavy benzin, anilin, light oils of wood tar, wood and grain alcohol, acetone, oil of acetone and other ketones, ethers and esters may be employed. Spirits of turpentine, wood turpentine, Russian turpentine, pine oil and fir tree oil may also be used. In the case of alcoholic solutions and the like, nitracellulose or celluloid or other colloidal thickener soluble in alcoholic menstruums may be incorporated to give body. The barium and calcium soaps of ricinoleic acid are somewhat soluble in alcoholic bodies and these and similar materials may likewise be employed for thickening the solutions.

The waxy materials referred to above serve a two-fold purpose, in that they give body to the solutions and aid in flatting. The unsaponifiable waxes are best from the standpoint of resistance to alkali. Chinese and Japanese waxes are saponifiable. Chinese wax or Chinese vegetable tallow forms a zinc soap which may be used as a thickener; in fact soaps may be made from both of these waxes which are useful colloiding bodies. Bayberry tallow is saponifiable. Beeswax consists largely of cerotic acid and myricyl palmitate with 12% to 15% of hydrocarbons of the ethylene series. It is slowly saponified by cement-alkali and is best used in the form of an oil-soluble metallic soap. Carnauba and shellac wax are difficultly soluble in the solvents preferably employed in making concrete oil compositions. Montan wax and montanic acid, spermaceti, paraffin, scale wax (a soft crude form of paraffin) ozocerite, or better its refined form ceresin, candelilla wax, palm wax and Chinese insect wax may be used.

Other materials which may be incorporated for certain applications are the resin esters, e. g. Manila, Congo, colophony. The esters of phenol, cresol, naphthol and glycerin with these resins and their condensation products may be employed. The condensation products of phenol, cresol, or other phenolic body with formaldehyde, using a basic or acid condensing agent may if not condensed beyond a certain point, be used in solution with Pontianak resin or other similar resinous body and the like.

For general purposes where a thickened composition is desired the following illustrative formula is especially applicable;— heat treated Jelutong resin 25 parts, ceresin 2 parts oil-soluble compound from cotton-seed oil and sulfur chlorid 8 parts, tung acids 10 parts, Japan drier 1 part, benzol 30 parts and benzin 24 parts. Rubber may be substituted for sulfureted cotton-seed oil in the case of very strongly alkalin cements. Tung acids are exceptionally good solvents of recovered rubber, and in using this relatively cheap rubber material the rubber stock may be separately heated with the tung acids until solution is effected and then mix with the other ingredients.

In the case of structural steel, which as a reinforcing material is to be embedded in concrete a rather viscous coating is to be preferred. Mixtures of guayule rubber resin and Pontianak resin in naphtha solution carrying a filler of dry finely-ground Portland cement are suitable, as set forth in Ser. No. 552,178. Recovered rubber may be used in lieu of guayule and as for such purposes a light colored oil is not usually required, mixtures of other materials such as pitches, tars, as candle tar, gilsonite, elaterite, asphalt and the like may be made use of. A certain degree of plasticity is desired in such compositions, coupled with good resistance to alkali. The composition must bond both with the steel and the concrete. The incorporation of Portland cement in the concrete oil aids in assimilating the coating composition with the concrete. For this purpose a formula of the following description may be employed;—Pontianak resin (heat treated) 25 parts, recovered rubber 10 parts, wax 5 parts, candle tar 5 parts, gilsonite 5 parts and coal tar naphtha 50 parts, to which mixture is added sufficient dry Portland cement or other filler to make a heavy bodied coating mixture.

By finish-forming constituents as used herein I intend to indicate those materials capable of forming a thin coherent film, including resinous bodies and siccative oils. Paraffin oil and other non-volatile petroleum and non-drying oils have not true finish-forming properties although used to adulterate drying oils and the like. When introduced into linseed or Chinese wood oil for example paraffin oil retards drying and after or during the process of drying the paraffin oil exudes more or less from the siccative oil film causing a greasy surface which collects dust and renders the oil coating or finish of low durability. Hence, although paraffin oil is unsaponifiable it is unsuited for incorporation in the compositions of the present invention except in very moderate amounts for fluxing or extending purposes. A small amount of petroleum oil sometimes is present in pontianak, being introduced at the time of coagulation or preparation of the raw gum. As petroleum oil reduces the melting point of Pontianak resin and in any substantial amount renders the resin soft and sticky, its use as an extending material is not recommended.

The process involved in the present invention comprises the application to cement or concrete objects or surfaces a coating or impregnating layer of the foregoing compositions or kindred compositions, which application for large work involves coating or impregnating by applying the material by means of a brush or spraying by the aid of a suitable spraying device; or a combination of the two methods, as for example a priming coat with a sprayer and a finishing coat or coats by the brush. Smaller articles, such as concrete railroad ties, fenceposts, concrete shingles, tiles and the like may be dipped into a tank containing a solution of the waterproofing material, in which case a very satisfactory degree of impregnation may be secured. Several coats may be applied in this way if desired. Rough surfaces of concrete buildings, such as a rough stucco finish are best treated by spraying, as the forcible impingement of the composition when impelled from a sprayer secures a better anchored coating in many cases. The present invention also contemplates especially the process of applying solutions of Jelutong or similar resin or wax or waxlike bodies or wax-resins in conjunction with oils and the like to concrete or cement structures or articles for the purpose of waterproofing these and hence includes the process of waterproofing concrete which involves superficially impregnating and coating the exposed surface of concrete, to a greater or less extent, by dipping spraying brush and the like, with a medium comprising an unsaponifiable or alkali-proof or resinous or waxy-resinous body as hereinbefore set forth in conjunction with a tempering or colloiding material such as tung oil, fish oil, the water-insoluble soaps of these and similar oils, rubber, or waxes, balata, petroleum jelly and the like.

With a solvent such as benzol a desirable spraying solution may be made from crude Pontianak rubber resin in the cold as follows;—the white powdery resin obtained from acetone or alcohol extraction process, etc., is dried without melting, preferably, so as to preserve the granular or comminuted condition. A vacuum drier may be used to advantage for this purpose. The dry material is then stirred with a quantity of benzol without heating, so as to secure practically a saturated solution. To three parts of this solution one part of tung oil and ⅛ part of Japan drier is added, when the composition is ready to be used. The incorporation of the materials in the cold that is the production of a cold-cut solution produces a flatter drying coating than when the materials are heat-blended. A still flatter effect is derived by the addition of about ¼ part of ceresin wax. Too much wax is undesirable especially in cold weather, as tending to thicken the composition so that it discharges from a sprayer with difficulty.

For coating acid tanks or as a dip for concrete vessels which are to be exposed to acids or acid fumes a solution of equal parts of Pontianak rubber resin and tetra or pentachlor naphthalene in benzol may be used.

In Letters Patent No. 999,708 of Aug. 1, 1911 illustrative methods of preparing stable solutions of Pontianak rubber resin have been given, special stress being given to heat treatment at relatively high temperatures for rather brief periods; but protracted heating at lower temperatures also yields stable solutions provided the precautions hereinbefore indicated are carefully observed: hence the present invention also embraces the process of treating shaped masses of hydraulic cement and the like, which comprises treating a substantially unsaponifiable resinous body such a Jelutong rubber resin by heating to a predetermined temperature and adjusting the period of heat treatment to cause the resin to become capable of forming stable solutions with hydrocarbon oils and the like, in reducing the treated resin to a flowable form by thinning with a "reducing" medium containing for example a hydrocarbon solvent, and in applying the resulting solution to the surface of said masses to superficially impregnate or coat same with a water-resistant coating; due regard being had for the condition of the concrete or other surface as to porosity etc. so that the consistency of the solution may be adjusted therefor.

In the case of concrete or stone or other building material exposed to the disintegrating action of molds and the like, the vehicle derived as above may contain creosote, anthracene oil or other antiseptic material.

What I claim is—

1. The process of waterproofing concrete which consists in coating and superficially impregnating same with a composition essentially a substantially unsaponifiable resinous body and Chinese wood oil.

2. The process of waterproofing concrete which comprises coating and superficially impregnating same with a fluent composition comprising Jelutong rubber resin and Chinese wood oil.

3. The process of impregnating concrete, which comprises applying thereto a composition comprising cold-cut Pontianak resin and Chinese wood oil.

4. The process of impregnating concrete which comprises applying thereto a cold-cut solution of unfused Pontianak resin in a hydrocarbon solvent in conjunction with Chinese wood oil.

5. The process of treating surfaces to protect same which ccomprises applying thereto a composition comprising essentially resinous material of a substantially unsaponifiable character and Chinese wood oil in solution in a suitable thinner in substantially the proportions described.

Signed at Montclair, in the county of Essex and State of New Jersey, this 16th day of October, A. D. 1911.

CARLETON ELLIS.

Witnesses:
BIRDELLA M. ELLIS,
NATHANIEL L. FOSTER.